United States Patent [19]

Yokoyama

[11] Patent Number: 4,673,215
[45] Date of Patent: Jun. 16, 1987

[54] SEAT FRAME FOR AUTOMOBILE SEATS

[75] Inventor: Shoh Yokoyama, Akishima, Japan

[73] Assignee: Tachikawa Spring Co., Ltd., Tokyo, Japan

[21] Appl. No.: 849,941

[22] Filed: Apr. 9, 1986

[30] Foreign Application Priority Data

Apr. 9, 1985 [JP] Japan .................... 60-52655[U]

[51] Int. Cl.⁴ .................................... A47C 7/02
[52] U.S. Cl. ........................... 297/452; 248/429; 248/430
[58] Field of Search .............. 297/452; 248/396, 430, 248/429

[56] References Cited

U.S. PATENT DOCUMENTS

| | | | |
|---|---|---|---|
| 1,771,987 | 8/1930 | Cronwall | 248/429 |
| 1,794,650 | 3/1931 | Simpson et al. | 248/429 |
| 2,014,553 | 9/1935 | Browne | 248/430 |
| 2,130,159 | 9/1938 | Saunders et al. | 248/430 |
| 4,222,543 | 9/1980 | Gedig et al. | 248/396 |
| 4,582,361 | 4/1986 | Kennel | 297/452 |

FOREIGN PATENT DOCUMENTS

| | | | |
|---|---|---|---|
| 2048326 | 4/1972 | Fed. Rep. of Germany | 297/452 |
| 0155126 | 9/1982 | Japan | 297/452 |

Primary Examiner—James T. McCall
Attorney, Agent, or Firm—Cushman, Darby & Cushman

[57] ABSTRACT

A seat frame for use in an automotive seat. The seat frame is divided into four sections, that is, front, rear, right and left sections, and at least the right and left sections or side frame members are respectively formed in a substantially Z-shaped configuration. Namely, each of the side frame members comprises a vertically extending web, an upper flange and a lower flange projecting in opposing directions to each other with respect to the web, whereby, when loads are applied to the side frame members, the respective centers of shearing thereof are caused to exist in their webs or adjacent portions thereof, resulting in the increased strength.

2 Claims, 8 Drawing Figures

SEAT FRAME FOR AUTOMOBILE SEATS

BACKGROUND OF THE INVENTION

1. Field of the Invention

The present invention relates to a seat frame for an automotive seat and, more particulary, to the reinforced structure of such seat frame.

2. Description of the Prior Art

Generally, as shown in FIG. 1, a seat S includes a seat frame (1) internally thereof which is formed of a rigid body such as metal or the like. That is, the seat S comprises the seat frame (1), a resilient member enclosing the periphery of the seat frame (1), and a trim cover assembly covering the surface thereof.

Conventionally, as such seat frame, there has been frequently used a seat frame which is formed as follows: that is, four frame materials each having a U-shaped section, namely, comprising a web and two upper and lower flanges projecting in the same direction relative to the web are connected to one another in a quadrilateral form with the flanges thereof facing internally. In this seat frame, when a lifter mechanism is equipped internally thereof, the lower flanges come into interference with the link means or leg means of the lifter mechanism. For this reason, there are formed holes or notches in the flanges, so that the link or leg means of the lifter mechanism can be faced to the lower side of the seat frame by means of such holes or notches.

Also, in a pan-type seat frame (1) as shown in FIGS. 2 and 3, when it is equipped with a lifter mechanism, two frame members of an L-shaped section are respectively attached to the two sides of the lower portion of the seat frame (1), and the link members (4)(5) of the lifter mechanism are connected to the vertical portions of the frame members (2), (see FIG. 2). On the other hand, when no lifter mechanism is provided, leg members (7) are fixedly secured to the lower portions of the two sides of the seat frame (1), so that the seat frame (1) can be attached via these leg members (7) to floor-side members such as slide rails and the like, (see FIG. 3).

In addition, such pan-type seat frame (1) is diadvantageous in strength, and, therefore, the side portions thereof are reinforced, especially the side surface thereof to which a reclining device is mounted is reinforced by a reinforcing member (8).

As described above, in the prior art, the seat frame formed of the frame materials each having a U-shaped section must be formed in the flange portions thereof with the holes or notches for prevention of interference with the lifter mechanism or the like, with the result that the seat frame is decreased in strength and involves a complicated manufacturing process which lowers the productivity thereof. This type of seat frame is also poor in a working efficiency due to the fact that, when it is directly fixed to the floor-side members such as the slide rails or the like, its upper flange stands in the way. Also, the pan-type seat frame requires another member for reinforcing or mounting, which increases the number of parts. As a result of this, the seat frame is disadvantageous in that it is heavy in weight and expensive.

SUMMARY OF THE INVENTION

The present invention is devised in view of the above-described circumstances in the prior art. Accordingly, it is an object of the invention to provide a seat frame which is improved in form to be able to eliminate the drawbacks found in the above-mentioned prior art seat frames.

To accomplish this object, according to one aspect of the invention, the present seat frame includes two right and left side frame members each of substantially Z-shaped cross-section. In the Z-shaped cross-section side frame members, when loads are applied thereto, their respective centers of shearing forces are to be set on their respective webs or on the portions adjacent thereto, with the result that no deflection will be produced in the two side frame members due to torsion. Therefore, the side frame member of Z-shaped cross-section is advantageous in strength over frame members of U-shaped or L-shaped cross section.

According to another aspect of the invention, the two right and left side frame members are formed such that the lower flanges thereof are faced outwardly respectively. This enables the front and rear links of a lifter mechanism to be rotated without interfering with the right and left side frame members, which eliminates the need to form holes or notches in the flanges of the right and left side frame members for prevention of interference. Thus, the seat frame formed of such side frame members, as a whole, is sufficiently reliable in strength as well as the manufacturing process thereof can be simplified, resulting in the improved productivity.

According to still another aspect of the invention, the front and rear links of the lifter mechanism can be pivotally attached directly to the two right and left frame members, which eliminates the need for provision of another members such as frames for arranging the lifter mechanism as in the prior art seat frames. As a result of this, the weight and cost of the seat frame can be reduced.

According to yet another aspect of the invention, the front frame of the present seat frame is provided with a longer upper flange and thus various parts can be mounted to this upper flange. For example, a power motor may be mounted to the lower surface of the upper flange and then may be connected to the operation shaft of the lifter mechanism, so that it can serve as an electric-powered lifter.

The above and other related objects and aspects of the invention will be apparent from a reading of the following description of the disclosure found in the accompanying drawings and novelty thereof pointed out in the appended claims.

DETAILED DSCRIPTION OF PREFERRED EMBODIMENTS OF THE INVENTION

Figure 1:
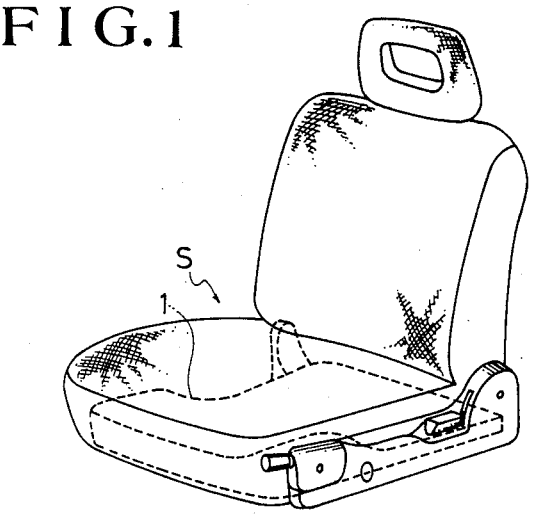
FIG. 1 is an explanatory view showing a seat frame provided within a seat.
Figure 2:
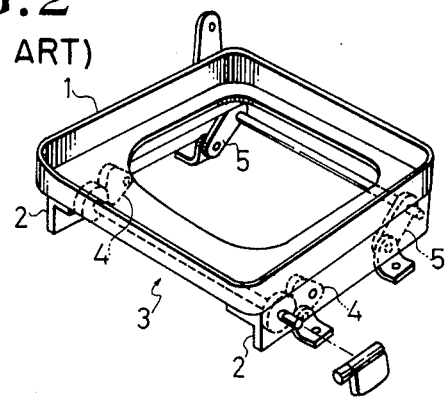
FIG. 2 is a perspective view of a conventional seat frame.
Figure 3:
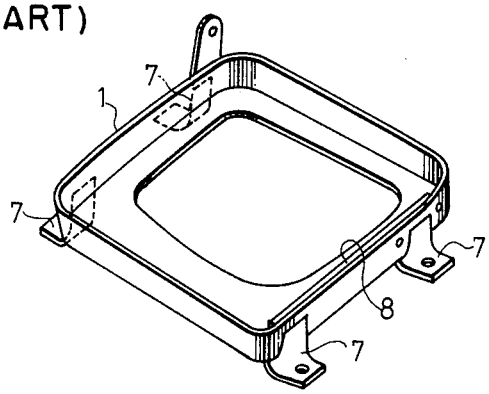
FIG. 3 is a perspective view of another conventional seat frame.
Figure 4:
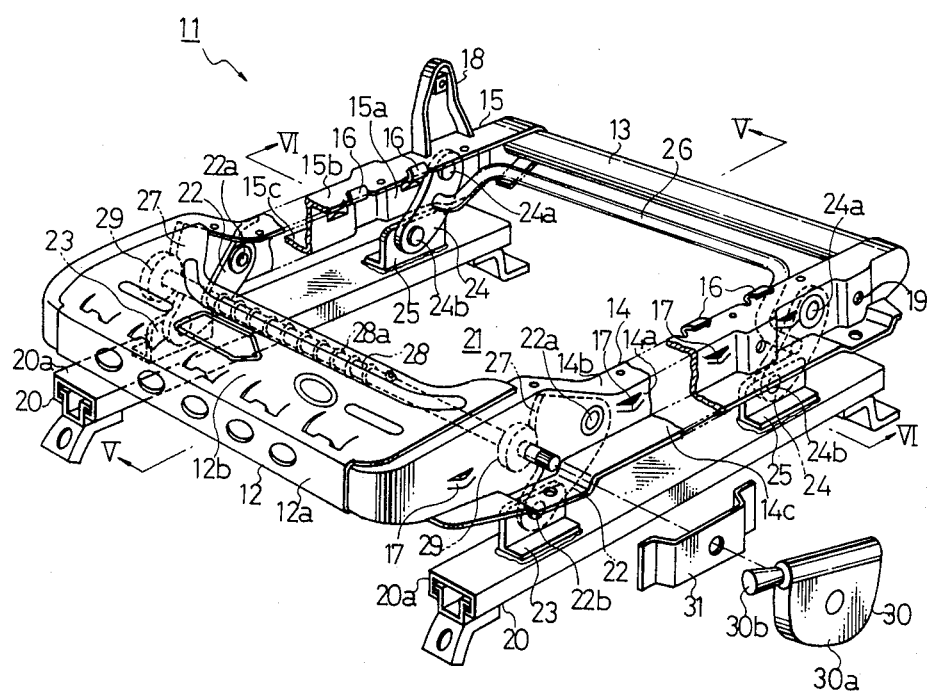
FIG. 4 is a perspective view of a seat frame according to the invention when it is mounted to slide rails through a lifter mechanism.
Figure 5:
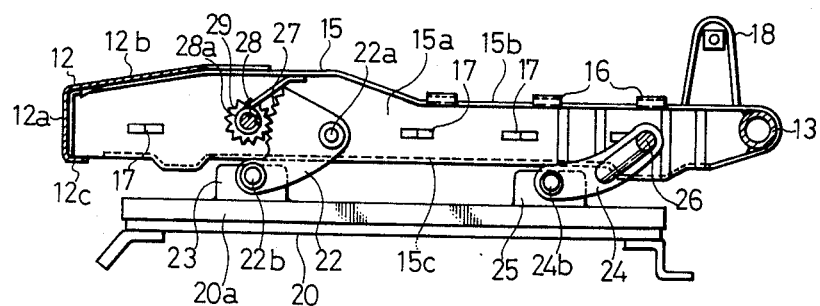
FIG. 5 is a sectional view taken along the line V—V in FIG. 4.
Figure 6:
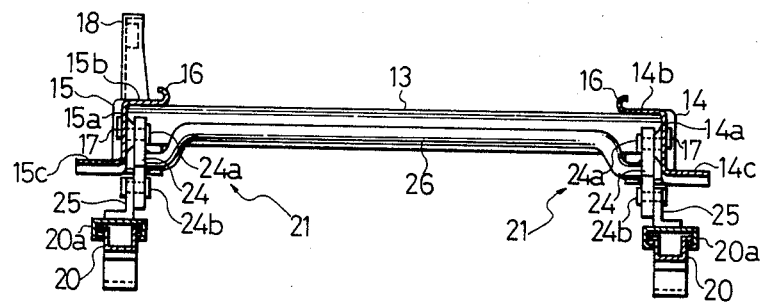
FIG. 6 is a sectional view taken along the line VI—VI in FIG. 4.

In the drawings, reference numeral (11) designates a whole seat frame constructed in accordance with the present invention. This seat frame (11) is a so-called a quadrisection frame which can be formed by connecting four independent frame members, that is, two front and rear frame members (12) (13) and two side frame members (14), (15) to one another in a quadrilateral form. The two right and left side frame members (14), (15) of the seat frame (11) comprise upper flanges (14b), (15b) extending inwardly and lower flanges (14c), (15c) extending outwardly relative to the webs (14a), (15a) thereof, that is, the upper and lower flanges extend in the mutually opposing directions to provide a substantially Z-shaped cross section.

The front frame member (12) is formed in a channel shape with its upper and lower flanges (12b), (12c) both extending inwardly of its web (12a), the upper flange (12b) being formed substantially longer than the lower flange (12c). The rear frame member (13) is formed of a pipe material of a round section.

Also, in the seat frame (11), along the inner edges of the upper flanges (14b), (15b) of the right and left side frame members (14), (15), there are provided clamp piece members (16) in an opposing manner, which members (16) are used to mount spring members for receiving a pad. On the external surfaces of the webs (14a), (15a) of the right and left side frame members (14), (15), there are provided a plurality of raised engagement portions (17) for securing the end portions of a trim cover assembly when the trim cover assembly is placed over the seat frame (11). Also, on the rear end portion of the upper flange (15b) of the right side frame (15), there is erected a hinge bracket (18) to which a seat back is connected, and, correspondingly to this, in the rear portion of the web (14a) of the left side frame member (14), there is formed a mount hole (19) for mounting a reclining device.

The seat frame (11) is mounted to slide rails (20) fixed to the side of a vehicle floor in a manner that it can be moved vertically by means of a lifter mechanism (21).

The above-mentioned lifter mechanism (21) is arranged as follows: that is, in the front portion of the seat frame (11), front links (22) are pivotally attached at the respective first ends thereof via shaft pins (22a) to the inside surfaces of the webs (14a), (15a) of the right and left side frame members (14), (15), respectively, while the other ends of the front links (22) are pivotally secured via shaft pins (22b) to leg members (23) fixed to the upper surface front portions of upper rails (20a) of the slide rails (20), respectively. In the rear portion of the seat frame (11), rear links (24) are pivotally mounted at the respective first ends thereof via shaft pins (24a) to the inside faces of the webs (14a), (15a) of the right and left side frame members (14), (15), with the other ends of the rear links (24) being pivotally attached via shaft pins (24b) to leg members (25) fixed to the upper surface rear portion of the upper rails (20a) of the slide rails (20), while the central portions of the two rear links (25) are interconnected via a connecting rod (26) to each other.

Also, the front links (22) are respectively provided with integrally projecting sector gears (27) centering around the pivotally connected portions of the front links to the right and left side frame members (14), (15). Correspondingly to the sector gears (27) of the front links (22), between the webs (14a) and (15a) of the two right and left side frame members (14) and (15) there is journaled an operation shaft (28), to both ends of which shaft (28) pinion gears (29) are fixed respectively. The pinion gears (29) are engaged with the sector gears (27) of the front links (22), respectively.

A torsion spring (28a) is wound around the operation shaft (28), with one end of the spring being secured to a knock pin projected from the operation shaft (28) and the other end thereof being abutted against and secured to the lower surface of the upper flange (15b) of the right side frame member (15), whereby the operation shaft (28) is rotatably biased in one direction. That is, the operation shaft (28) is rotatably biased so that the front links (22) can be risingly rotated via the pinion gears (29) about the pivoally mounted portions thereof to the leg members (23).

Further, one end of the operational shaft (28) is projected externally through the web (14a) of the left side frame member (14), and a lock device (30) is mounted to the projected portion of the shaft (28).

This lock device (30) employs a conventionally well known rotational engagement mechanism and thus a detailed description about the lock device (30) is not given here. Briefly, it comprises a device body (30a) to be connected to the operation shaft (28), and an operation lever (30b) which can be slided so as to come out of or go into the device body (30a). When the operation lever (30b) is stored within the lock device body (30a), the lock device (30) is then locked unrotatable relative to a bracket (31) fixed to the outer surface of the web (14a) of the left side frame member (14). When the operation lever (30b) is drawn out of the lock device body (30a), such locking is removed.

And, when the operation lever (30b) is pulled out of the lock device body (30a) to thereby remove such locked condition, then the torsion spring (28a) resiles to rotate the operation shaft (28). This rotational movement of the operation shaft (28) is transmitted via the pinion gears (29) to the sector gears (27) of the front links (22), so that the front links (22) are rotated in the stand-up direction thereof and at the same time the rear links (24) are also risingly rotated in the stand-up direction thereof via the associated frame members. As a result of this, the seat frame (11) is moved upwardly. Thus, when the seat frame (11) reaches a desired position in height, the operation lever (30b) can be stored within the lock device (30). In this way, the seat frame (11) can be adjusted in height.

Heretofore, the seat frame (11) according to the invention has been described on assumption that it is mounted via the lifter mechanism (21) to the slide rails (20). The seat frame (11) of the invention, however, may also be mounted directly to the slide rails (20) with no intervention of the lifter mechanism.

Figure 7:
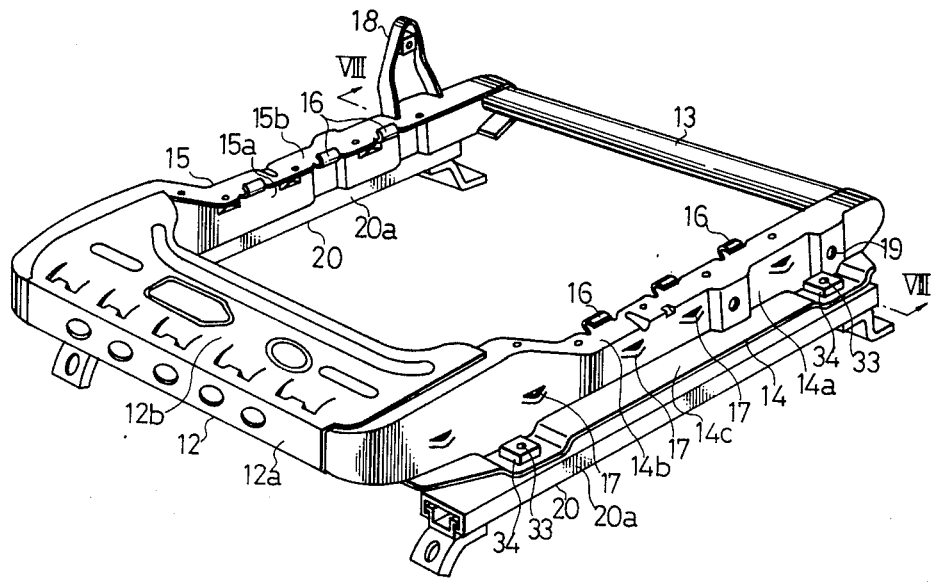
FIG. 7 is a perspective view of a seat frame according to the invetnion when it is mounted directly to the slide rails without using the lifter mechanism; and, FIG. 8 is a sectional view taken along the line VIII—VIII in FIG. 7.
Figure 8:
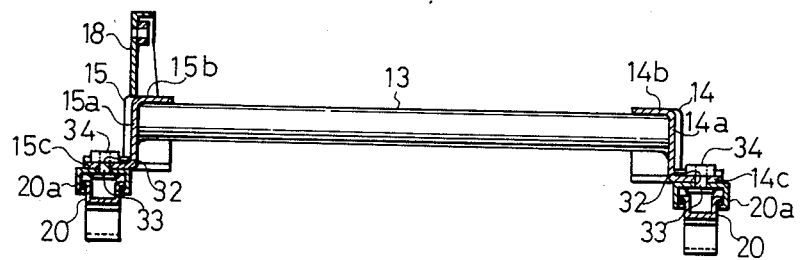

That is, as shown in FIGS. 7 and 8, in this case, the seat frame (11) is fixed to the upper surfaces of the upper rails (20a) of the slide rails (20) with bolts (33) and nuts (34) through mount holes (32) formed in the respective front and rear portions of the lower flanges (14c), (15c) of the two right and left side frame members (14), (15). It should be noted here that such mounting of the seat frame (11) can be easily realized in the above-mentioned lower flanges (14c) and (15c), because the engagement portions (17) for engagement of the trim cover assembly are provided in the webs (14a) and (15a) of the right and left side frame members (14) and (15) and thus the lower flanges (14c), (15c) are exposed externally even when the seat frame (11) is covered with the trim cover assembly.

Accordingly, in this embodiment, the lower flanges (14c) and (15c) of the right and left side frame members (14) and (15) are used to mount the seat frame (11) directly to the slide rails (20), thereby eliminating the need for provision of further members such as leg members or the like as in the conventional seat frames. This is effective in improving the productivity of the seat frame as well as reducing the cost thereof.

In the illustrated seat frame (11), although only the right and left side frame members (14) and (15) are formed so as to have a substantially Z-shaped cross section, of course, the front and rear frame members (12) and (13) may also be formed similarly in a substantially Z-shaped cross section.

Also, in the illustrated embodiment, as described above, the right and left side frame members (14), (15) are coupled to the front and rear frame members (12), (13), with the upper flanges (14b), (15b) thereof facing internally and the lower flanges (14c), (15c) thereof facing externally. However, for example, when the seat frame (11) is mounted to slide rails which are narrow in width and are located inwardly of the two right and left side frame members (14), (15), the seat frame (11) may be formed in a manner that the right and left side frame members (14), (15) are reversed in direction as against the illustrated embodiment, that is, the upper flanges (14b), (15b) thereof are faced externally while the lower flanges (14c), (15c) thereof are faced internally. Thus, the seat frame (11) can be attached to the above narrow slide rails in the internally facing lower flanges (14c), (15c) of the side frame members thereof.

As has been discussed hereinbefore, the seat frame of the invention is advantageous in strength, since the right left side frame members thereof are respectively formed in a substantially Z-shaped cross section with the result that the shearing centers thereof exist in the webs therefor or adjacent portions thereof. Also, in case where the seat frame of the invention is provided with a lifter mechanism therein, the parts of the lifter mechanism can respectively be attached to the right and left side frame members with no interference of the flanges thereof and thus there is eliminted the need to form holes or notches in the flanges of the frame members, with the result that the seat frame of the invention is advantageously increased in strength. At the same time, there is no need for provision of further members such as frames for arrangement of the lifter mechanism and, therefore, the seat frame of the invention can be reduced in weight. On the other hand, in case where the seat frame of the invention is not equipped with such lifter mechanism, the seat frame can be mounted directly to members on the side of the vehicle floor by using the lower flanges of the right and left side frame members thereof to thereby eliminate the need for provision of further members such as leg members or the like, which is advantageous in productivity and is also effective in reducing the cost thereof. Accordingly, the present invention provides great practical effects.

What is claimed is:

1. A seat frame comprising:
   first and second side frame members each comprising a vertically extending web, an upper flange element integrally formed on an upper edge of said web and a lower flange element integrally formed along a lower edge of said web, said upper and lower flanges projecting horizontally in opposite directions from said web;
   a front frame member welded to a forward end of each of said side frame members, said front frame member having a channel-shaped configuration and including an upper flange and a lower flange, said upper flange of said front frame member being longer than said lower flange of said front frame member; and
   a rear frame member welded to a rearward end of each of said side frame members.

2. A seat frame as in claim 1, wherein said upper flange of each of said side frame members projects inwardly relative to said web and said lower flange of each of said side frame members projects outwardly relative to said web.

* * * * *